M. L. R. HOWALD & J. M. McGEORGE.
TRANSMISSION GEAR.
APPLICATION FILED JULY 6, 1907.
913,503.
Patented Feb. 23, 1909.
2 SHEETS—SHEET 1.
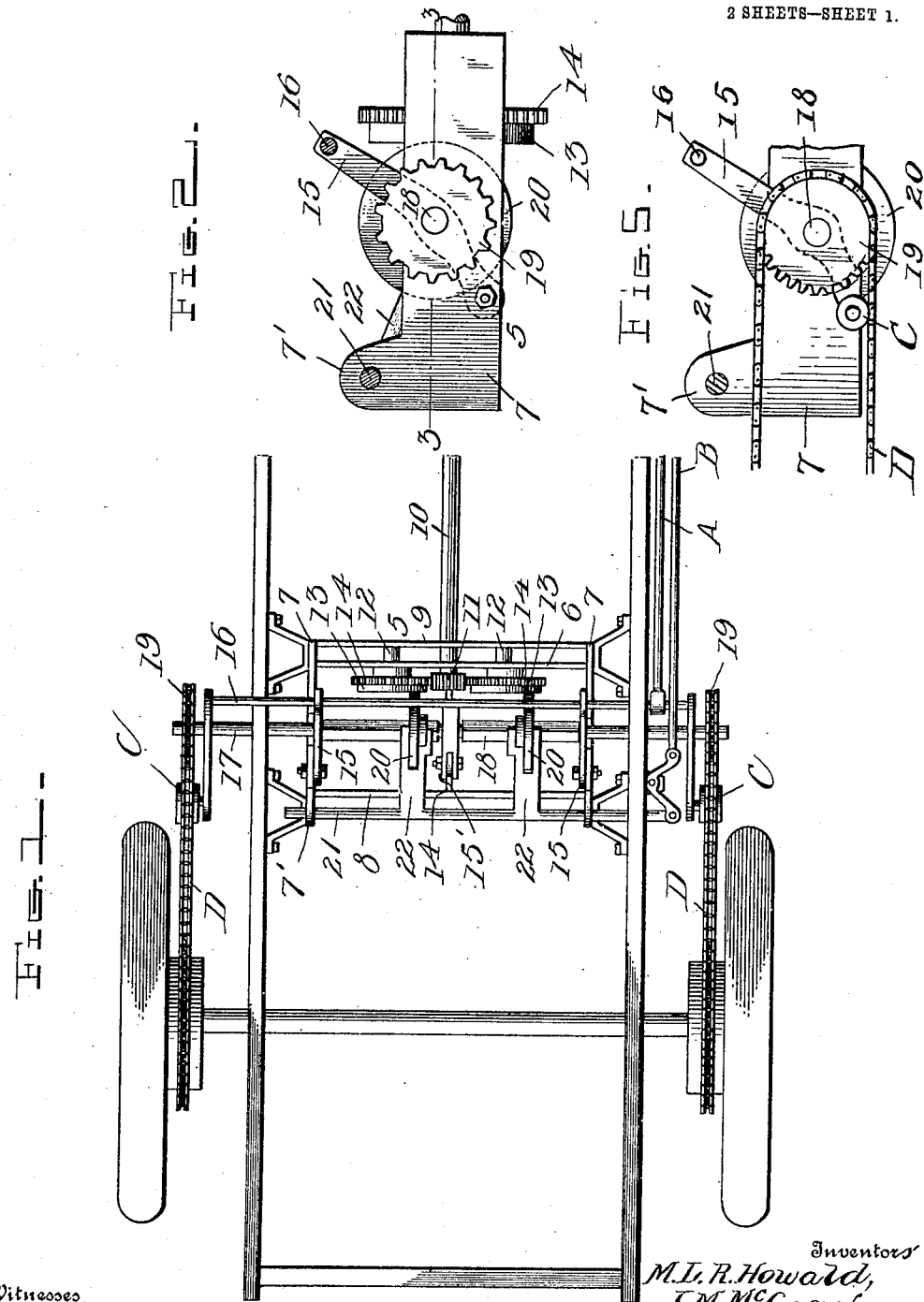

M. L. R. HOWALD & J. M. McGEORGE.
TRANSMISSION GEAR.
APPLICATION FILED JULY 6, 1907.

913,503.

Patented Feb. 23, 1909.
2 SHEETS—SHEET 2.

Witnesses

Inventors
M. L. R. Howald,
J. M. McGeorge,
By Woodward & Chandlee
Attorneys

UNITED STATES PATENT OFFICE.

MELVILLE L. R. HOWALD AND JAMES M. McGEORGE, OF SALEM, OHIO.

TRANSMISSION-GEAR.

No. 913,503.

Specification of Letters Patent.

Patented Feb. 23, 1909.

Application filed July 6, 1907. Serial No. 382,560.

*To all whom it may concern:*

Be it known that I, MELVILLE L. R. HOWALD and JAMES M. McGEORGE, citizens of the United States, residing at Salem, in the county of Columbiana and State of Ohio, have invented certain new and useful Improvements in Transmission-Gears, of which the following is a specification.

This invention relates to gearing, and more particularly to transmission gears, and has for its object to provide a transmission gear of the friction type which may be shifted to vary the speed of the driven shaft and which will include means for throwing the disks out of operative relation.

Another object is to provide means for idling the drive chains when the parts are out of gear.

Other objects and advantages will be apparent from the following description and it will be understood that changes in the specific structure shown and described may be made within the scope of the claims without departing from the spirit of the invention.

Figure 3:
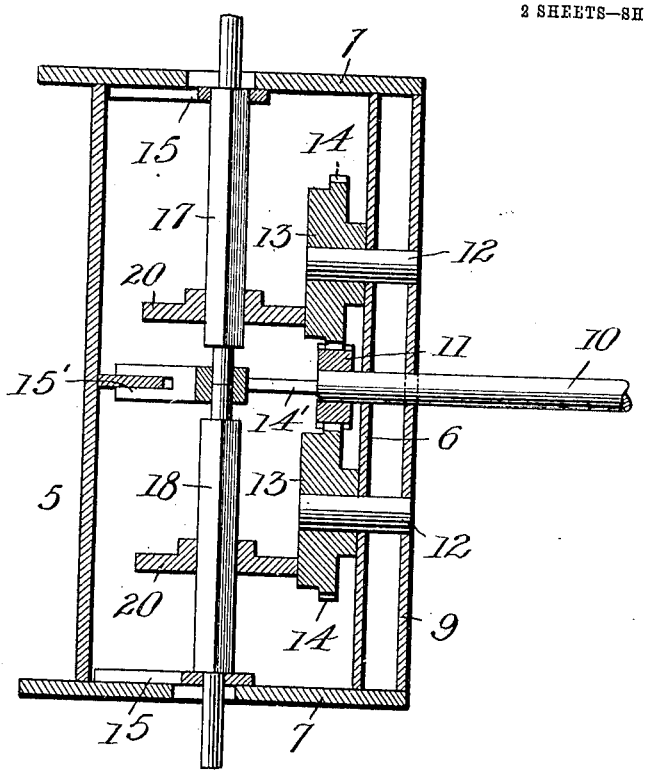
Figure 4:
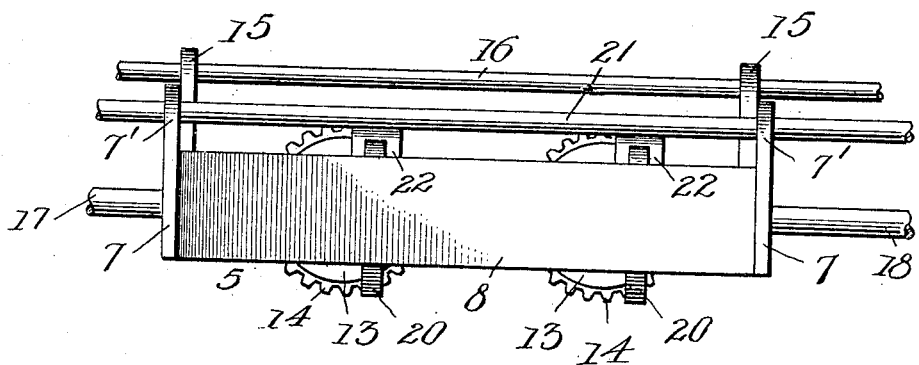

In the drawings forming a portion of this specification, and in which like characters of reference indicate similar parts in the several views, Figure 1 is a top plan of a portion of an automobile chassis; the present transmission gear being mounted thereupon; Fig. 2 is a side elevation of the gear frame; Fig. 3 is a horizontal section on line 3—3 of Fig. 2 taken through the split shaft and the stub shafts; Fig. 4 is a rear elevation. Fig. 5 is a detail view showing one of the idlers engaged with the sprocket chain.

Referring now to the drawings, the present transmission gear includes a frame 5, rectangular in top plan, which is designed to be disposed transversely of the automobile in which it is used, as shown in Fig. 1. The frame includes a forward member 6, end members 7 and a rear member 8 and a supplemental front member 9 is secured longitudinally within the frame in parallel relation to the member 6 and spaced therefrom.

A central drive shaft 10 is journaled at one end in the two members 6 and 9 between the ends thereof and extends inwardly of the member 9, where it carries a spur gear wheel 11, and stub shafts 12 are journaled in the members 6 and 9 at opposite sides of the shaft 10, extending inwardly of the member 9 and carrying friction disks 13 having their friction faces directed rearwardly, and provided with outwardly extending peripheral gear teeth 14 meshing with the spur gear wheel 11.

A central brace member 14 extends between the front and rear members of the frame at the lower portions thereof and mounted in the frame there are a plurality of brackets 15, arranged in longitudinal series and pivoted for movement toward and away from the friction disks 13, these brackets being connected at their upper ends by a rod 16. The central bracket, indicated at 15', is bifurcated and receives in its bifurcation, the brace member 14, to which it is pivoted, the other brackets being pivoted to the end members 7. Two coaxial shafts, 17 and 18 are journaled in the brackets above their pivot points, the bracket 15' receiving the inner ends of these shaft sections, while the outer ends thereof are extended outwardly through the outer brackets 15, and upon their outer ends, these shaft sections have drive sprockets 19 secured thereto. Between the brackets, the shaft sections are squared, and mounted upon each of these squared portions, there is a friction wheel 20, these wheels being arranged for engagement of their peripheries against the faces of the disks 13 and being movable upon the shaft sections, diametrically of these disks to vary the speed, as will be readily understood, and it will be observed that through movement of the brackets, the wheels may be brought into and out of engagement with the disks.

Upwardly extending ears 7' are carried by the rearward portions of the ends 7 of the frame, and in these ears there is slidably mounted a shift rod 21, carrying yokes 22 embracing the wheels 20 for movement of the latter upon their respective shaft sections simultaneously.

It will be understood that suitable operating levers A and B are provided for movement of the brackets 15 and the shift rod 21, and idlers C are provided for the sprocket chains D engaged with the sprockets 19, and are so arranged that when the sprockets are moved rearwardly which would tend to loosen the chains, the latter will be engaged by the idlers and held taut thereby, to prevent their disengagement from the sprockets.

What is claimed is:

1. In a transmission gear, the combination with friction disks, of two coaxial shafts mounted for movement toward and away from the disks, friction wheels mounted for sliding movement upon the shafts, over the faces of the friction disks, means for moving the shafts, and means for moving the wheels.

2. In a transmission gear, the combination with friction disks, of two coaxial shafts, and friction wheels mounted upon the shafts for rotation therewith and for sliding movement thereupon, said shafts being movable to bring the wheels into and out of engagement with the disks.

3. In a transmission gear, the combination with friction disks, of shafts movable toward and away from the friction disks, friction wheels carried by the shafts and arranged for movement therewith into and out of engagement with the friction disks, sprockets carried by the shafts, drive chains connected with the sprockets, and idlers arranged for movement to take up slack in the chains when the shafts are moved to bring the friction wheels out of engagement with the friction disks.

4. In a transmission gear, the combination with a frame, of a drive shaft journaled in the frame, a spur gear wheel carried by the shaft, friction disks mounted in the frame at opposite sides of the shaft and having gear teeth meshing with the spur gear wheel, brackets pivoted in the frame, two coaxial shafts journaled in the brackets, friction wheels mounted upon said shafts for movement longitudinally thereupon, and means for moving the wheels, said brackets being movable upon their pivots to bring the wheels into and out of engagement with the disks.

In testimony whereof we affix our signatures, in presence of two witnesses.

MELVILLE L. R. HOWALD.
JAMES M. McGEORGE.

Witnesses:
D. J. HANNA,
E. E. HANNA.